United States Patent
Leon et al.

(10) Patent No.: US 8,051,261 B2
(45) Date of Patent: *Nov. 1, 2011

(54) METHOD AND SYSTEM TO LOCATE A STORAGE DEVICE

(75) Inventors: Jean-Michel Leon, Santa Clara, CA (US); Louis Marcel Gino Monier, Menlo Park, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/907,769

(22) Filed: Oct. 19, 2010

(65) Prior Publication Data

US 2011/0035558 A1   Feb. 10, 2011

Related U.S. Application Data

(63) Continuation of application No. 11/965,571, filed on Dec. 27, 2007, now Pat. No. 7,827,365, which is a continuation of application No. 10/964,846, filed on Oct. 13, 2004, now Pat. No. 7,366,856.

(51) Int. Cl.
*G06F 12/00* (2006.01)

(52) U.S. Cl. ......... 711/161; 707/6; 707/10; 707/999.01; 707/999.101; 711/4; 711/114; 711/162; 711/202; 713/100; 713/102; 713/105

(58) Field of Classification Search .............. 707/6, 10, 707/101, 999.006, 999.01, 999.101; 711/4, 711/114, 161, 162, 202; 718/102, 105, 100
See application file for complete search history.

(56) References Cited

U.S. PATENT DOCUMENTS

| 4,442,503 | A | 4/1984 | Schutt et al. |
| 7,366,856 | B2 | 4/2008 | Leon et al. |
| 2006/0080493 | A1 | 4/2006 | Leon et al. |
| 2008/0133878 | A1 | 6/2008 | Leon et al. |

OTHER PUBLICATIONS

"U.S. Appl. No. 10/964,846, Response filed Nov. 21, 2007 to Final Office Action mailed Sep. 6, 2007", 11 pgs.
"U.S. Appl. No. 10/964,846, Notice of Allowance mailed Dec. 21, 2007", NOAR,6 pgs.
"U.S. Appl. No. 11/965,571 Notice of Allowance mailed Jun. 28, 2010", 7 pgs.
"U.S. Appl. No. 11/965,571, Non-Final Office Action mailed Sep. 16, 2008", 7 pgs.
"U.S. Appl. No. 11/965,571, Response filed Dec. 16, 2008 to Non-Final Office Action mailed Sep. 16, 2008", 11 pgs.
"U.S. Appl. No. 11/965,571, Non-Final Office Action mailed Jan. 7, 2010", 5 pgs.
"U.S. Appl. No. 11/965,571, Non-Final Office Action mailed Apr. 3, 2009", 5 pgs.
"U.S. Appl. No. 11/965,571, Response filed Apr. 7, 2010 to Non Final Office Action mailed Jan. 7, 2010", 9 pgs.
"U.S. Appl. No. 11/965,571, Response filed Jul. 2, 2009 to Non Final Office Action mailed Apr. 3, 2009", 9 pgs.

*Primary Examiner* — Kevin Ellis
*Assistant Examiner* — Mehdi Namazi
(74) *Attorney, Agent, or Firm* — Schwegman, Lundberg & Woessner, P.A.

(57) ABSTRACT

A method of locating a storage device of a number of storage devices is provided. A request for a data item is received. The request includes a globally unique identifier (GUID) that is associated with a user. A start number is generated based on the GUID, and the storage device that stores the data item is located based on the start number. The data item is then read from the located storage device. Other techniques for locating a storage device are also described.

20 Claims, 13 Drawing Sheets

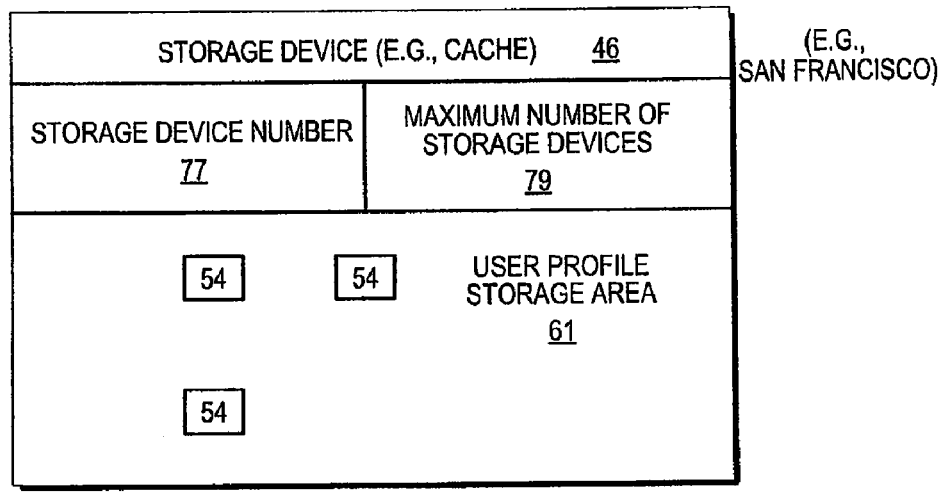
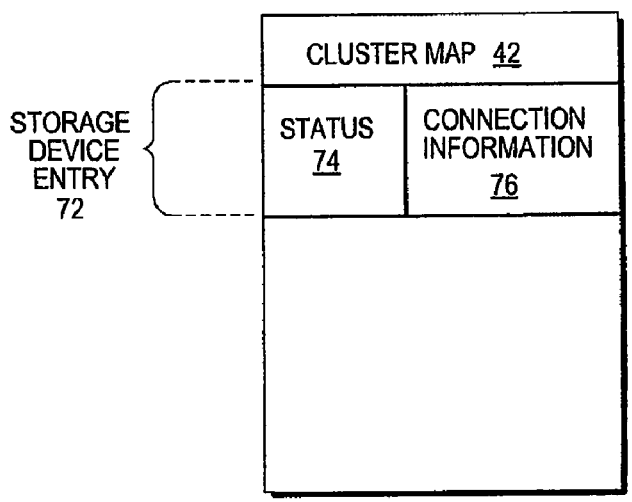
Fig. 3A

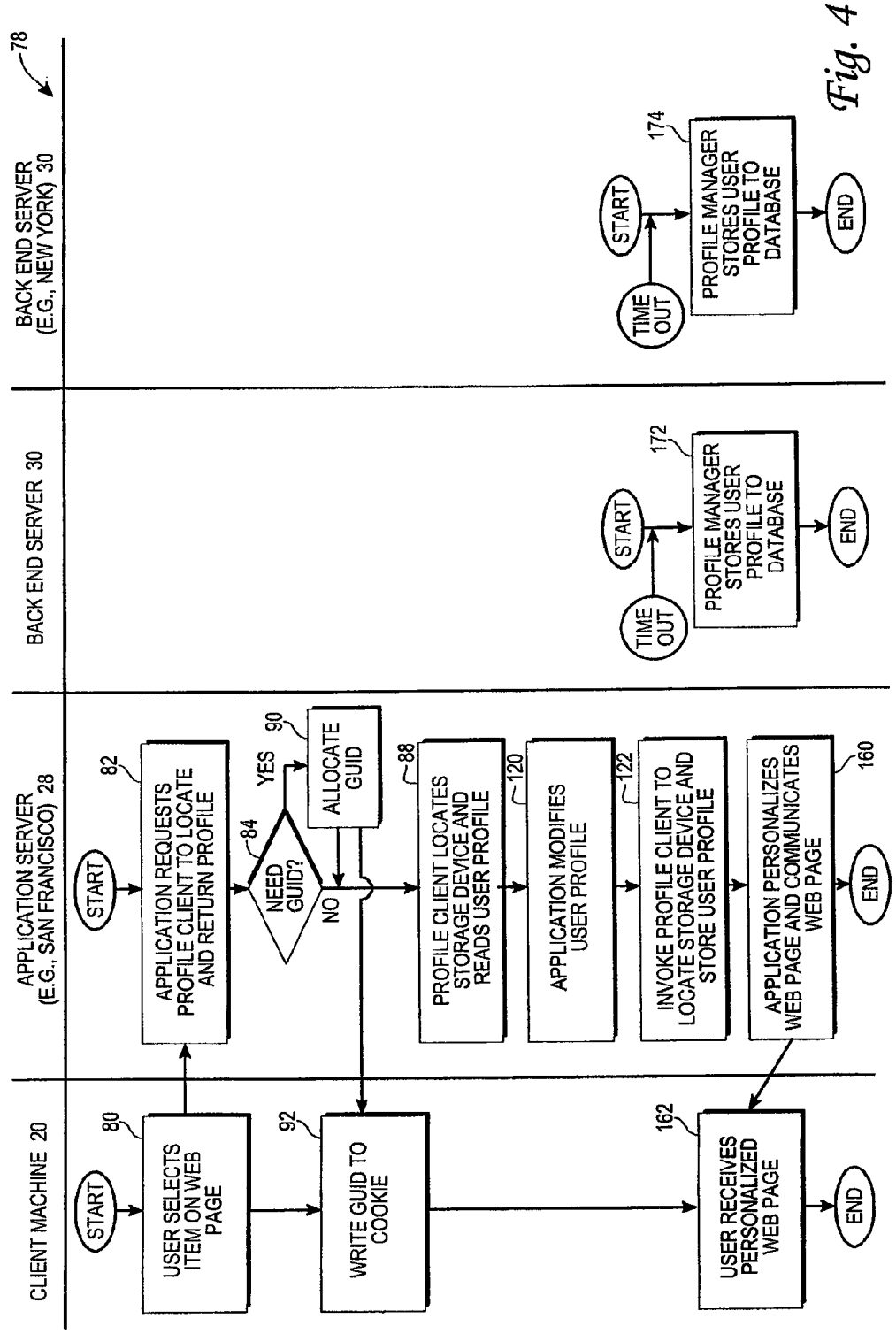

METHOD AND SYSTEM TO LOCATE A STORAGE DEVICE

RELATED APPLICATIONS

The present application is a continuation of U.S. patent application Ser. No. 11/965,571, now U.S. Pat. No. 7,827,365, filed Dec. 27, 2007, and entitled "METHOD AND SYSTEM TO LOCATE A STORAGE DEVICE," which is continuation of U.S. patent application Ser. No. 10/964,846, now U.S. Pat. No. 7,366,856, filed on Oct. 13, 2004, and entitled "METHOD AND SYSTEM TO LOCATE A STORAGE DEVICE," the applications of which are incorporated in their entirety herein by reference.

TECHNICAL FIELD

An embodiment relates generally to the technical field of data storage and, in one exemplary embodiment, to a method and system to locate a storage device.

BACKGROUND

Systems that store large quantities of data typically utilize multiple storage devices because multiple storage devices address the issues of availability and scalability. For example, data may not be available if stored on a single storage device that fails (e.g., cannot be accessed due to a hardware or software failure). Multiple storage devices may be utilized to overcome the lack of availability by providing a backup storage device that may be accessed if a primary storage device fails. In addition, an organization tends to require more storage capacity over time and the incremental addition of storage devices (scaling) may be preferable to expanding the capacity of a single storage device. Thus, multiple storage devices may be utilized to overcome the issues of scalability and availability. Nevertheless the utilization of multiple storage devices poses issues of load balancing and affinity.

BRIEF DESCRIPTION OF THE DRAWINGS

The present invention is illustrated by way of example and not limitation in the figures of the accompanying drawings, in which like references indicate similar elements and in which:

FIG. 3A is a block diagram illustrating databases, according to an exemplary embodiment of the present invention;

FIG. 4 is an interactive flow chart illustrating a method, according to an exemplary embodiment of the present invention, to utilize a user profile to personalize a web page;

DETAILED DESCRIPTION

Figure 1:
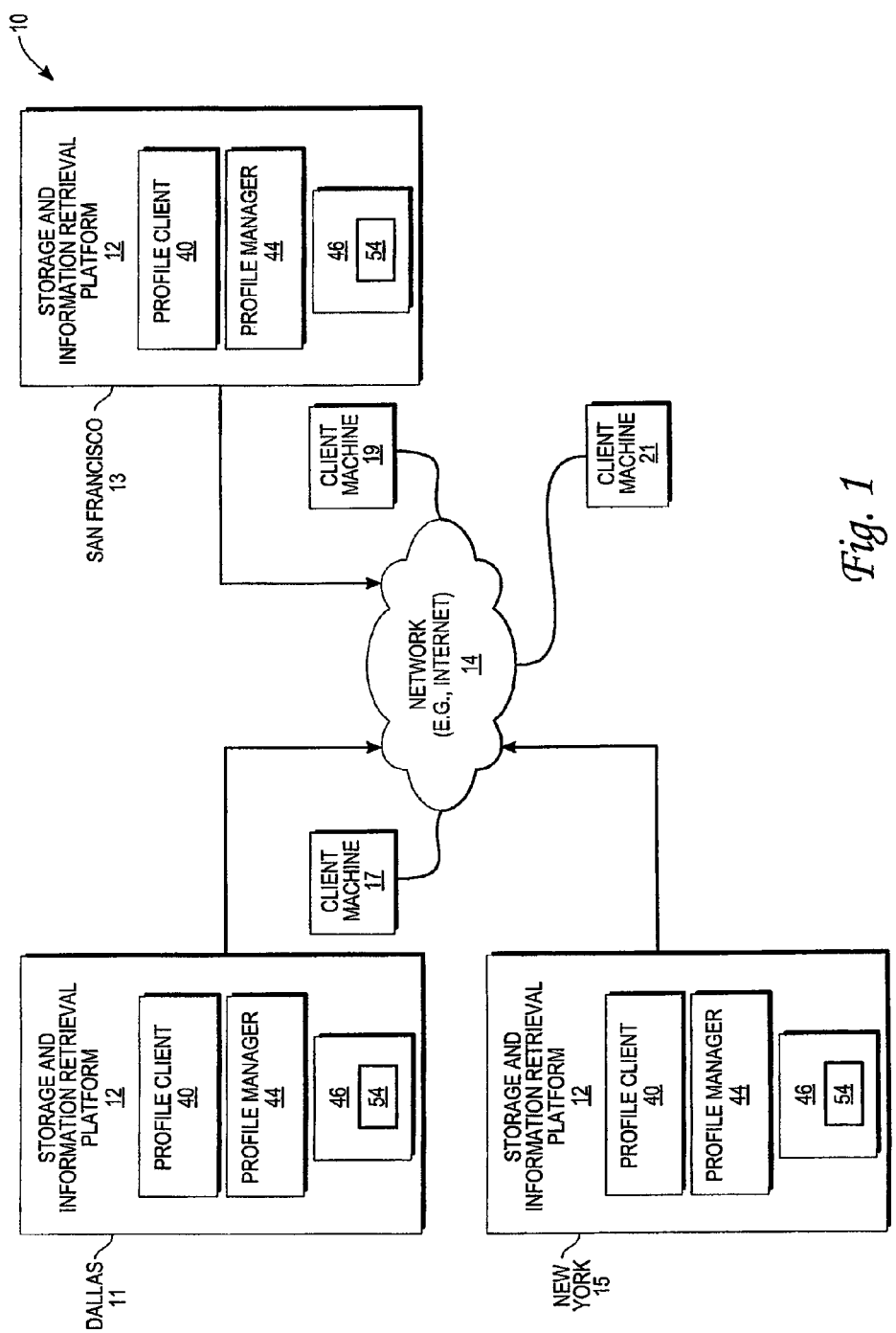
FIG. 1 is a network diagram depicting a system, according to one exemplary embodiment of the present invention.

A method and system to locate a storage device are described. In the following description, for purposes of explanation, numerous specific details are set forth in order to provide a thorough understanding of the present invention. It will be evident, however, to one skilled in the art that the present invention may be practiced without these specific details.

Load Balancing and Affinity

Load balancing may be concerned with locating a storage device to initially store a data item so that many data items will be distributed across a set of storage devices and affinity is concerned with subsequently retrieving the data item from the storage device. For example, an initial request to store a data item requires that a system locate a storage device from multiple storage devices to store the data item. In addition, a subsequent request for the data item requires the system to locate the correct storage device to retrieve the data item. These issues have been addressed with a number of schemes. One scheme utilizes a modulo to locate a storage device to store a data item. For example, assume a data item is associated with a unique identifier that ranges from 1 to 1000 and also assume that a system includes 10 storage devices. Such a system may utilize a modulo 10 to locate the storage device to store the data item. Simply put, the unique identifier is divided by the modulo and the remainder is utilized to locate the proper storage device. A disadvantage of this scheme is that adding or removing storage devices may require halting the system to recompile software modules or to update the appropriate applications with the new modulo. Another scheme may utilize a round robin approach that randomly locates storage devices. This scheme may store information (e.g., identifying the storage device, identifying the data item, associating the storage device with the data item) in a database to enable the retrieval of the data item. A disadvantage of this scheme is that removing storage devices may also require halting the system to update the database files. Other schemes may utilize other approaches (e.g., locate the storage device with the least number of connections, locate the storage device with the least number of data items, etc.); however, they also exhibit the above-described disadvantages.

The issues of load balancing and affinity typically also need to be addressed if a storage device fails. For example, as described above, a data item is typically stored on two storage devices, the secondary storage device providing a backup copy of a data item. One approach may be to dedicate a secondary storage device to exclusively backup another storage device. This approach is expensive because it doubles the number of storage devices in a system. Another approach may be to utilize a storage device that dedicates a portion of capacity to backup support. This approach requires the reservation of sufficient capacity to prevent overloading. Both approaches fail to balance the load of a failed storage device over the remaining storage devices.

In general, embodiments described below feature a system that provides personalization services to an application that personalizes a web page before communicating the web page to a user. The system provides personalization services by maintaining a user profile for each user in the system that is identified with a globally unique identifier (GUID). The user profile uniquely characterizes the user based, for example, on previous selections by the user, demographic information about the user, and other stored information that is personal to the user. The user profile is stored in at least two storage devices (e.g., caches), a first or primary storage device and a second or secondary storage device. Dual storage is utilized to sustain personalization services notwithstanding a single point of failure that prevents access to one of the storage devices. Further, the two copies may be stored on any two storage devices in a system that includes N storage devices. For example, a sequence of storage devices may be determined based the output of a double-hash algorithm that receives as input an GUID that corresponds to a user profile and a parameter that specifies the maximum number of storage devices (MNSD) in the system. The sequence of the storage devices has the property that each storage device in the system appears in the sequence without repetition. The first two storage devices that are determined to be available are utilized to store the user profile. Thus, a storage device may be removed from the system or added to the system (e.g., up to N storage devices) without halting the system to reconfigure configuration files or to recompile applications because a search for backup storage devices continues until the maximum number the storage devices (MNSD) are exhausted. The user profile is simply stored on and retrieved from the first two available storage devices. In addition, the above scheme backs up a primary storage device by evenly distributing a backup copy of the user profiles to the remaining storage devices. For example in a system of 5 storage devices, the above scheme may evenly distribute the user profiles of a primary storage device to each of the four secondary storage devices in the system (e.g., each of the secondary storage device stores 25% of the data items that are stored as primary storage on the primary storage device). Thus, a primary storage device failure results in evenly distributing the user profiles over all of the secondary storage devices.

More specifically, an exemplary system may function in the following manner. A user makes a selection on a web page that generates a request for the user's user profile. The request further includes an GUID that is associated with and identifies the user. The GUID and the maximum number of storage devices (MNSD) are provided as parameters to a double hash algorithm that generates a start number and a step number. The start number is utilized to locate a primary storage device. If the primary storage device is available, then the user profile is read from the primary storage device. Otherwise the start number is added to the step number to generate a location number that can be used to identify a secondary storage device. If the secondary storage device is available then the user profile is read from the secondary storage device. If the secondary storage device is not available, the step number is added to the location number to generate a new location number that can be utilized to identify a further secondary storage device. The step number continues to be added to the previously computed location number until the storage devices are exhausted or an available secondary storage device is located. Accordingly, the double-hash algorithm generates start and step numbers that are used to generate a sequence of location numbers for respective storage devices. The sequence of location numbers identify a sequence of storage devices without specifying the same storage device twice (e.g., the step number is relatively prime to the MNSD). One embodiment may utilize an MNSD that is larger than the actual installed number of storage devices, thereby facilitating the addition of storage devices to the system (e.g., scaling) without halting the system for recompilation of software or reconfiguration of configuration files. For example, a system may include an MNSD with a value of five although the system may also include only three storage devices that are installed. During operation, the generated search sequences will include storage device numbers that identify the two uninstalled storage devices (e.g., storage device 4 and 5), each with an unavailable status. Thus, the two storage devices may not be available for the storage or retrieval of user profiles; nevertheless, if additional capacity is required then up to two storage devices may be added to the system without impact.

FIG. 1 is a network diagram depicting a system 10, according to one exemplary embodiment of the present invention, having a client-server architecture. Platforms, in the exemplary form of an information storage and retrieval platform 12, provides server-side functionality, via a network 14 (e.g., the Internet) to one or more clients 17, 19, 21. FIG. 1 illustrates multiple information storage and retrieval platforms 12 communicating over a wide geographical region, for example, an information storage and retrieval platform 12 is located at Dallas, San Francisco, and New York, 11, 13 and 15. Each information storage and retrieval platform 12 includes a profile client 40 and a profile manager 44. The profile client 40 at a specific information storage and retrieval platform 12 may request personalization services from a profile manager 44 at any storage and retrieval platform 12. For example, the profile client 40 at Dallas 11 may request the profile manager 44 at Dallas, San Francisco or New York 11, 13, or 15 to return a user profile 54 from a storage device 46 that is associated with the profile manager 44 at the specific location. Further, while the system 10 shown in FIG. 1 employs a client-server architecture, the present invention is of course not limited to such an architecture, and could equally well find application in a distributed, or peer-to-peer, architecture system.

Figure 2:
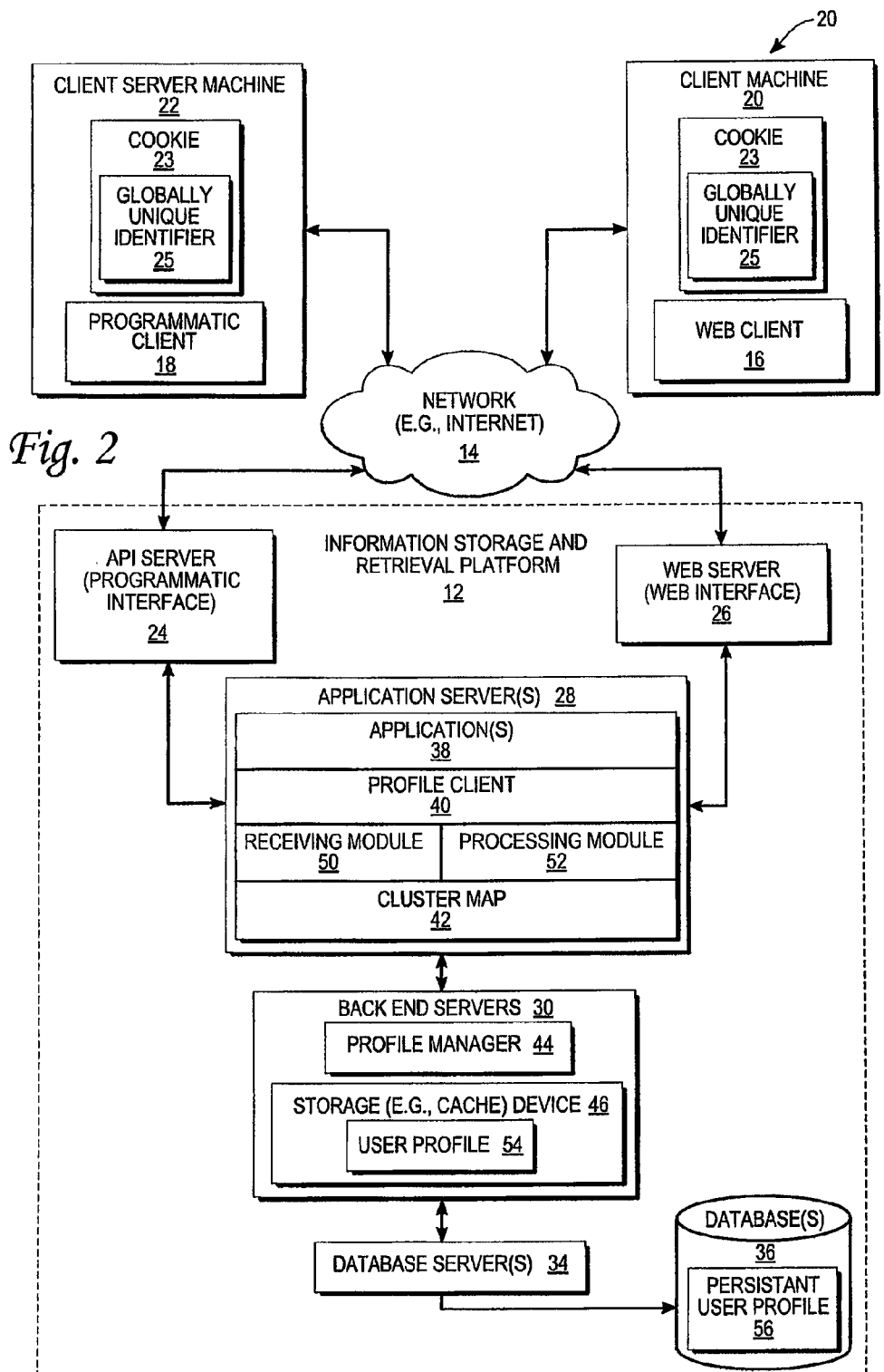
FIG. 2 is a network diagram depicting software and hardware components of the system, according to one exemplary embodiment of the present invention.

FIG. 2 is a network diagram depicting software and hardware components 20, according to one exemplary embodiment, for the system 10. FIG. 2 illustrates, for example, a web client 16 (e.g., a browser, such as the INTERNET EXPLORER browser developed by Microsoft Corporation of Redmond, Wash. State), and a programmatic client 18 executing on respective client machines 20 and 22. In addition, the client machines 20 and 22 include a cookie 23 that includes a data identifier or data number, in the exemplary form of a globally unique identifier 25 (GUID). A personalization service may drop the cookie 23 that contains the GUID 25 to the client machine 20 or 22 to uniquely identify a user that operates the respective client machine 20 or 22.

Turning specifically to the information storage and retrieval platform 12, an application program interface (API) server 24 and a web server 26 are coupled to, and provide programmatic and web interfaces respectively to, one or more application servers 28 that host applications 38. The web client 16, it will be appreciated, accesses the applications 38 via the web interface 26 supported by the web server 26. Similarly, the programmatic client 18 accesses the various services and functions provided by the applications 38 via the programmatic interface provided by the API server 24. The applications 38 may invoke a profile client 40 to obtain personalization services. As described above, the profile client 40 may provide personalization services by communicating with a local profile manager 44 (e.g., San Francisco 13) or by communicating with a remote profile manager 44 (e.g., Dallas, or New York, 11 and 15). Specifically, the personalization services performed by the profile manager 44 may include reading a data item, in the exemplary form of a user profile 54, from and/or storing a user profile 54 to a storage device 46 (e.g., cache) at the respective site (e.g., San Francisco, Dallas, or New York, 13, 11 and 15). To this end, the profile client 40 includes a receiving module 50 and a processing module 52 that may access a cluster map 42 to determine whether the profile manager 44 at a respective site 11, 13, and 15 is available (e.g., the profile client 40 may actively communicate with the profile manager 44 over an HTTP connection).

The processing module 52 allocates GUIDs and identifies primary and secondary storage devices 46. The processing module 52 allocates an GUID in response to a first request from a user for a user profile. The processing module 52 communicates the GUID 25 to the client machine (e.g., client machines 22, 20) that stores the GUID 25 in a cookie 23 on a local storage device of the client. Thereafter, the client machine 22, 20 requests the user profile by including the allocated GUID. The GUID 25 generated by the processing module 52 is guaranteed to be unique (e.g., guaranteed unicity across space and time). The processing module 52 generates the GUID 25 by combining the address of a networking card that is associated with a specific application server 28, a start time, and a counter of previously allocated GUIDs 25. In addition, the processing module 52 utilizes a double hash algorithm to identify or locate primary and secondary storage devices 46 as described in FIG. 3B.

The back servers 30 are shown to include the previously described profile manager 44 and the storage device 46 (e.g., cache) which may include one or more user profiles 54. Each user profile 54 includes information pertaining to a particular user, as described further below. The back end servers 30 facilitate access to one or more database servers 34 that are utilized to access databases 36. The databases 36 are illustrated to include one or more persistent user profiles 54 which may be non-volatile copies of the one or more user profiles 54 that reside in the storage device 46 on the back end servers 30.

FIG. 3A is a block diagram illustrating a user profile 54, a storage device 46, and a cluster map 42, according to an exemplary embodiment. The user profile 54 includes a globally unique identifier (GUID) 25, user attributes 56, personalization attributes 58, session attributes 60 and persistent attributes 65. The GUID 25 uniquely identifies a single user of the system 10 and is utilized to identify a user profile 54.

The user attributes 56, personalization attributes 58, session attributes 60 and persistent attributes 65 may each contain attributes 67 (not illustrated). Each attribute may be a datum of information about a user (e.g., past selection, purchasing history, demographic information, geographic information, age, gender, prior web page selection, elapsed time for current session, etc.). The user attributes 56 are attributes that may be copied from existing databases 36 for a particular user. For example, the databases 36 may include a purchasing history database that includes recent purchases of the user that the profile manager 44 copies into the user profile 54. Other embodiments may include a preferences database that characterizes user preferences. The personalization attributes 58 are information inserted or modified by off line tools that utilize personalization rules, batch jobs, etc. The personalization attributes 58 and the user attributes 56 are read only attributes and may not be modified by the applications 38.

The session attributes 60 are transient attributes kept in the profile for the duration of a session only. A session may begin when the information storage and retrieval platform 12 receives a request from a user that is operating a client machine 22, 20. The session may end after a period of time elapses without detecting user activity (e.g., a mouse click). For example, in one embodiment the period of time may be five minutes. The session attributes 60 may be contrasted with the persistent attributes 65 which are written to the database 36 and available from one session to another.

The storage device 46 (e.g., cache) is utilized to store one or more user profiles 54. The storage device 46 includes a storage device number 77, a maximum number of storage devices 79 (MNSD), and a user profile storage area 61. The storage device number 77 uniquely identifies a particular storage device 46 in the system 10. For example, FIG. 1 illustrates three information storage and retrieval platforms 12 (San Francisco, New York, and Dallas) each of which may include a storage device 46 that is uniquely identified or located with a storage device number 77 (e.g., 1, 2, and 3). FIG. 1 read in view of FIG. 2 further illustrates a single storage device 46 at information storage and retrieval platforms 11, 13 and 14; however, it will be appreciated that other embodiments may include multiple storage devices 46 for each information storage and retrieval platform 12. The MNSD 79 may define the maximum number of storage devices for the system 10 and is utilized by the double hash algorithm. Typically the MNSD 79 number may be greater than the actual number of storage devices 46. For example, FIG. 1 read in view of FIG. 2 illustrates a system 10 with storage devices 46 at San Francisco, New York and Dallas (e.g., identified with storage device numbers 77, namely 1, 2 and 3). Nevertheless, the MNSD 79 for such a system 10 may be greater than 3, for example 5, as described above.

The user profile storage area 61 is utilized to store and retrieve (e.g., read) user profiles 54. A user profile 54 may be stored in the user profile storage area 61 if the storage device 46 is identified solely with a start number or if the storage device 46 is identified with the aid of a step number. If the user profile 54 is identified solely with the start number, then primary storage capacity is utilized and if the user profile 54 is identified with a start number and a step number then secondary storage capacity is utilized.

The cluster map 42 includes multiple storage device entries 72. Each storage device entry 72 includes a status 74 and connection information 76. The storage device entry 72 corresponds to a particular storage device 46 that may reside on a back end server 30 at a particular information storage and retrieval platform 12. The profile client 40 reads the status 74 to determine if the storage device 46 is available for storing or reading user profiles 54. For example, in one embodiment, the connection information 76 may include HTTP connection information that is utilized by the profile client 40 to connect to and communicate with the profile manager 44 at the respective information storage and retrieval platforms 12. The profile managers 44 maintain the cluster map 42 and communicate an up-to-date cluster map 42 to the profile clients 40 on the application servers 28.

Figure 3B:
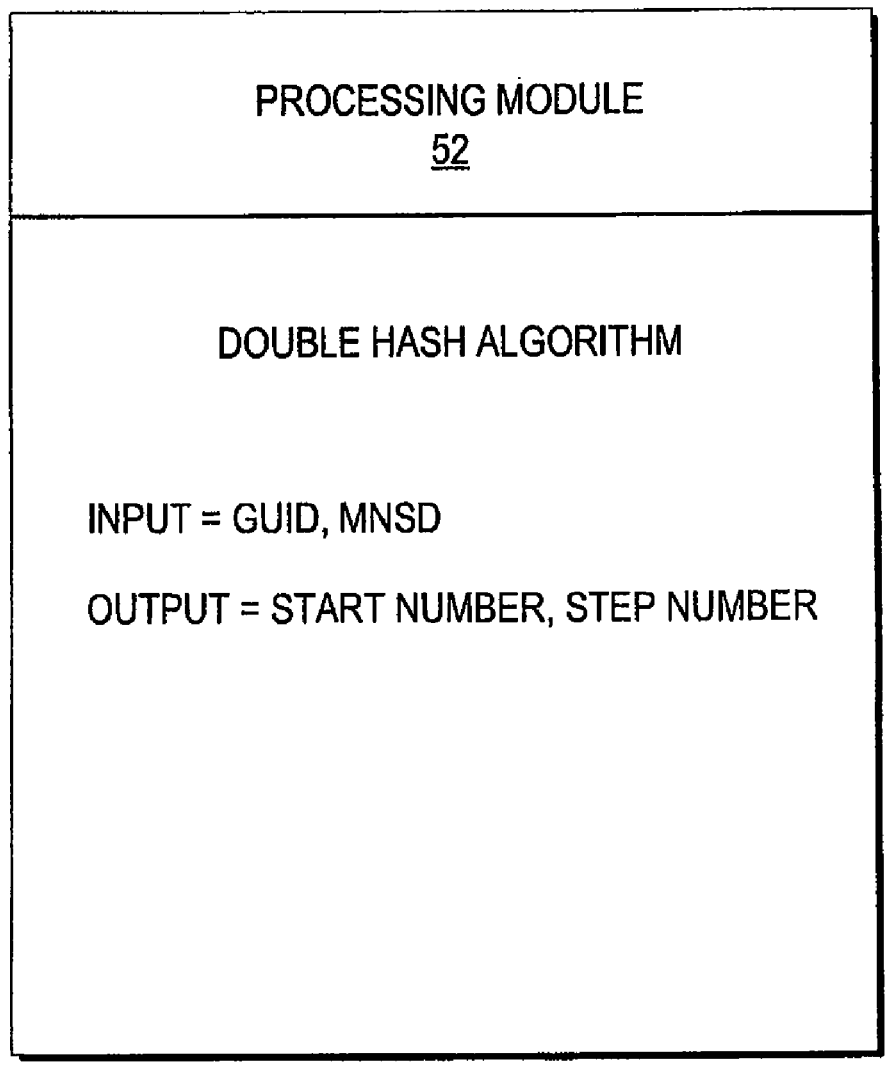
FIG. 3B is a block diagram illustrating a double-hash algorithm, according to an exemplary embodiment of the present invention.

FIG. 3B is a block diagram illustrating a double-hash algorithm 43, according to an exemplary embodiment, that is executed by a processing module 52. The double-hash algorithm 43, as previously stated, is utilized to identify primary and secondary storage devices 46. The double-hash algorithm 43 receives inputs in the form of an GUID 25 and an MNSD 79 and generates outputs in the form of a start number and a step number. The start and step numbers are intermediate values that are utilized to identify primary and secondary storage devices 46. For example:

Double Hash (GUID, MNSD)=step number, start number
Input: GUID=1, MNSD=5;
Output: start number=1, step number=1;

Recall that the start number and step number are further utilized to produce a search sequence to locate an available storage device 46. For example, the profile client 40 may determine whether a storage device 46 is available by first computing a search sequence composed of successive storage device numbers 77 as follows: start number, start number+(1×step number)+(2×step number); start number+(3×step number); number+(4×step number). Consequently, the profile client 40 may search for an available storage device 46 with the following search sequence: "1, 2, 3, 4 and 5" (e.g., start number=1, step number=1, MNSD=5). Note that the storage device 46 that is identified with the storage device number 77 of "1" is computed solely with the start number and may therefore be deemed a primary storage device because primary storage capacity may be utilized. All of the other storage device numbers 77 are computed with the aid of the step number and accordingly are deemed secondary storage devices because secondary storage capacity may be utilized. Accordingly, if the primary storage device 46 is available then the user profile 54 may be read from or written to the user profile storage area 61 of the primary storage device 46. However, if the primary storage device 46 is not available then the user profile 54 may be read from or written to the user profile storage area 61 of a secondary storage device 46 (e.g., 2, 3, 4 or 5).

One embodiment of the double-hash algorithm 43 may be utilized to generate start and step numbers that utilize 50% of the user profile storage area 61 as a primary storage device and 50% of the user profile storage area 61 as a secondary storage device. Other embodiments of the double-hash algorithm may utilize other ratios.

The double-hash algorithm 43 may exhaust the primary storage area capacity of one storage device 46 before utilizing the primary storage area capacity of another storage device 46. For example, consider the following GUID 25 allocations: A, B, C, D, and E. The double hash algorithm may compute the following start and step numbers:

Double Hash (GUID, MNSD=5)=start number, step number

| GUID | Start number | Step number |
|------|--------------|-------------|
| A    | 1            | 1           |
| B    | 1            | 2           |
| C    | 1            | 3           |
| D    | 1            | 4           |
| E    | 1            | 1           |

Note that the primary storage capacity associated with the storage device 46 that is located with the start number one is utilized or allocated before the primary storage capacity of another storage device 46. Also note that the above allocation scheme ensures that the user profiles 54 that are stored on the storage device 46 that is located with the start number one will be evenly distributed in the remaining storage devices 46.

FIG. 4 is an interactive flow chart illustrating a method 78, according to an exemplary embodiment, to utilize a user profile to personalize a web page. The method 78 illustrates a client machine 20 on the left and servers on the right. The servers include an application server 28 at San Francisco, a back end server 30 at San Francisco, and a back end server 30 at New York.

Figure 7:
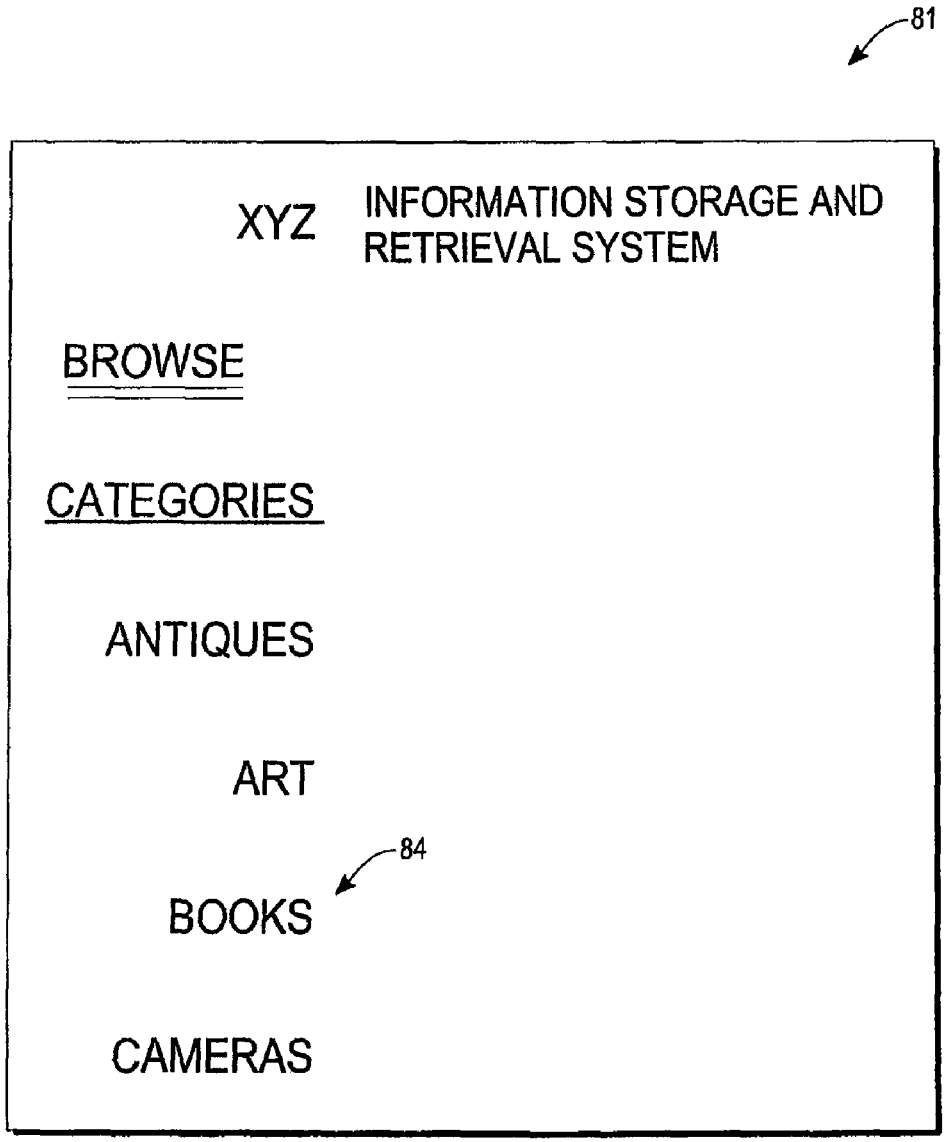
FIGS. 7-8 illustrate user interface screens, according to an exemplary embodiment of the present invention.

At the client machine 20, at operation 80, a user operating a client machine 20 selects a user interface element on a web page. FIG. 7 illustrates a user interface 81, according to an exemplary embodiment. The user interface 81 illustrates a web page to browse categories on the XYZ Information Storage and Retrieval System. The user selects a books category 84 at the client machine 20.

Returning to FIG. 4, at operation 82, an application 38 at the application server 28 in San Francisco 13 receives the request and invokes a profile client 40 to locate and return the user profile 54 associated with the user at the client machine 20. It will be appreciated that the application 38 may be one of many applications 38 that may utilize personalization services by invoking the profile client 40. At decision operation 84, the profile client 40 determines if an GUID 25 was communicated with the request for the user profile 54. If an GUID 25 was communicated, then a branch is made to operation 88. Otherwise, a branch is made to operation 90.

At operation 90, the profile client on the application server 28 at San Francisco 13 receives a request to allocate an GUID 25. The profile client 40 allocates the GUID 25 and communicates the GUID 25 to the web client 16 on the client machine 20, the web client 16 persistently storing the GUID in a cookie (operation 92). Henceforth, the client machine 20 communicates the GUID 25 to the information storage and retrieval platform 12 with each subsequent user interface selection.

Figure 5:
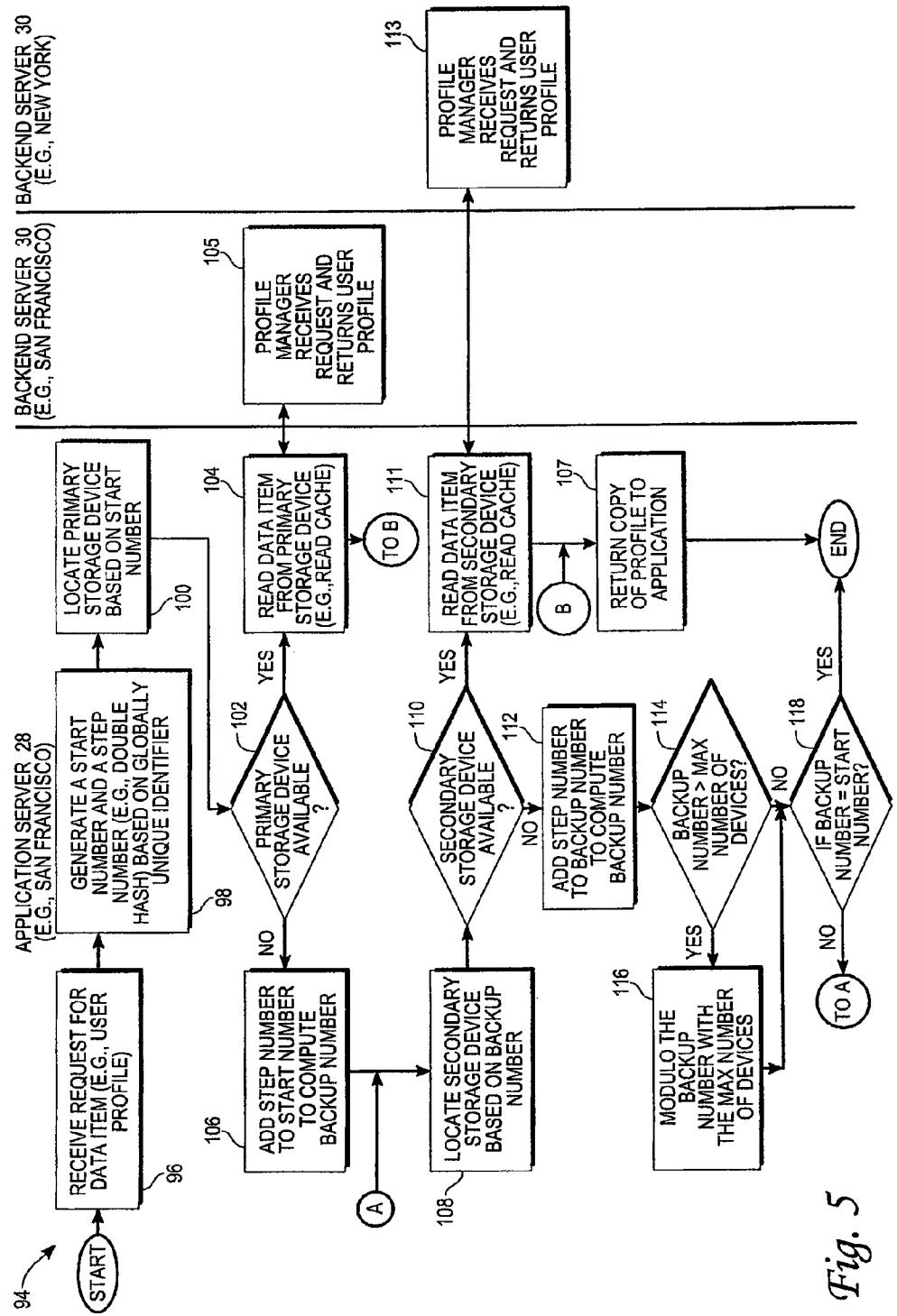
FIG. 5 is an interactive flow chart illustrating a method, according to an exemplary embodiment of the present invention, to locate storage devices to read a data item.

At operation 88, the profile client 40 locates a storage device 46 and reads the user profile 54 from the storage device 46. FIG. 5 is an interactive flow chart illustrating a method 94, according to an exemplary embodiment, to locate at least two storage devices from a plurality of storage devices to read a data item (e.g., the user profile 54). The method 94 illustrates at left, middle, and right an application server 28 at San Francisco, a back end server 30 at San Francisco, and a back end server 30 at New York, respectively.

At operation 96, the receiving module 50 receives a request for the user profile 54, the request including the GUID 25 associated with the user at the client machine 20. At operation 98, the processing module 52 generates a start number and a step number by executing the double hash algorithm with the GUID 25 associated with the user and the MNSD 79. At operation 100, the processing module 52 utilizes the start number to locate the primary storage device 46 by utilizing the step number to index to the appropriate storage device entry 72 in the cluster map 42. At decision operation 102, the processing module 52 determines if the primary storage device 46 is available by utilizing the status 74. If the processing module 52 determines that the primary storage device 46 has an available status 74 then a branch is made to operation 104. Otherwise, a branch is made to operation 106.

At operation 104, the processing module 52 communicates a request, including the GUID 25, to the profile manager 44 at San Francisco 13 to read the user profile 54 from the storage device 46 (e.g., cache).

At operation 105, the profile manager 44 at San Francisco 13 receives the request and reads the user profile 54 from the user profile storage area 61 of the storage device 46 (e.g., cache). If the profile manager 44 determines that the user profile 54 is not in the storage device 46 (e.g., cache) then the profile manager 44 requests the corresponding persistent user profile 54 from the database servers 34 that, in turn, reads the corresponding persistent user profile 54 from the database 36. Next, the profile manager 44 at San Francisco 13 communicates the user profile 54 back to the profile client 40 at San Francisco 13 and processing continues at operation 107. At operation 107, the profile client 40 returns the user profile 54 to the application 38 and processing continues on FIG. 4 at operation 120.

At operation 106, the processing module 52 on the application server 28 at San Francisco 13 adds the step number to the start number to compute a back up number that is utilized to locate a secondary storage device. The processing module 52 utilizes the backup number to index to the appropriate storage device entry 72 in the cluster map 42 (operation 108).

At decision operation 110, the processing module 52 determines if the secondary storage device 46 is available by utilizing the status 74. If the status 74 indicates that the secondary storage device 46 is available then a branch is made to operation 111. Otherwise, a branch is made to operation 112.

At operation 111, the processing module 52 communicates a request to the profile manager 44 at New York 15 to read the user profile 54 from the secondary storage device 46.

At operation 113, the profile manager 44 at New York 15 receives the request and reads the user profile 54 from the storage device 46 (e.g., cache). If the profile manager 44 determines that the user profile 54 is not in the storage device 46 (e.g., cache) then the profile manager 44 requests the corresponding persistent user profile 54 from the database servers 34 that, in turn, reads the corresponding persistent user profile 54 from the database 36. Next, the profile manager 44 at New York 15 communicates the user profile 54 back to the profile client 40 at San Francisco 13.

At operation 112, the processing module 52 on the application server 28 at San Francisco 13 adds the step number to the backup number to compute a new back up number. At decision operation 114, the processing module 52 determines if the back up number is greater than the maximum number of storage devices 79 (MNSD). If the back up number is greater than the MNSD 79 then a branch is made to operation 116. Otherwise, a branch is made to decision operation 118.

At operation 116, the processing module 52 modulos the back up number with the maximum number of storage devices (MNSD) and saves the result in the backup number.

At decision operation 118, the processing module 52 determines if the back up number is equivalent to the start number. If the back up number is equivalent to the start number, the method 94 ends and processing continues at operation 120 on FIG. 4. Otherwise, the method 94 branches to box number operation 108.

Figure 6:
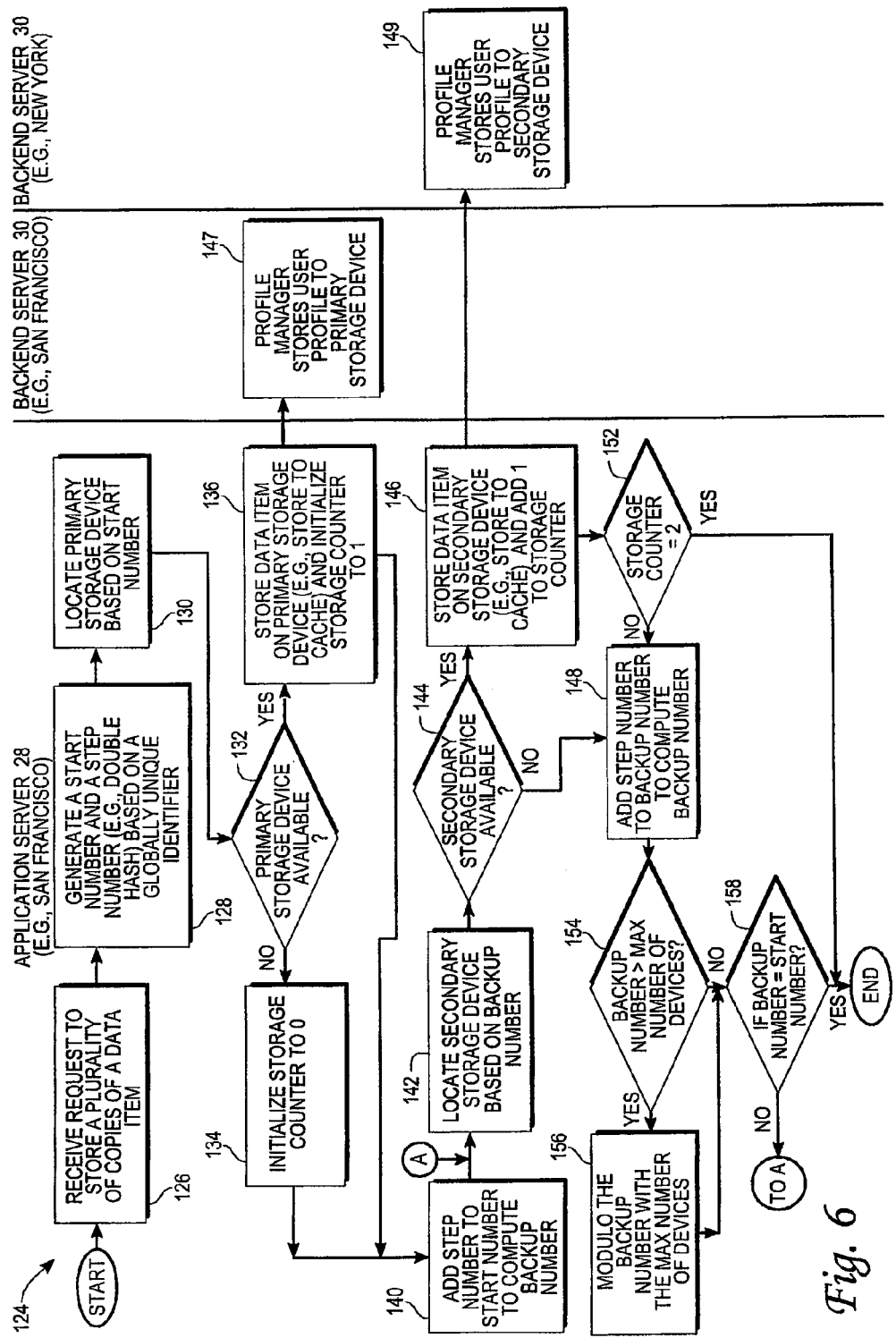
FIG. 6 is an interactive flow chart illustrating a method, according to an exemplary embodiment of the present invention, to locate storage devices to store a data item.

Returning to FIG. 4, at operation 120, the application 38 modifies the user profile 54 based on the user's selection of the books category from the browse web page. At operation 122, the application 38 invokes the processing module 52 to locate a storage device 46 (e.g., cache) to store the user profile 54. FIG. 6 illustrates a method 124, according to an exemplary embodiment, to locate at least two storage devices to store a data item. At operation 126, the receiving module 50 receives a request to store a plurality of copies of a data item (e.g., user profile 54).

At operation 128, the processing module 52 utilizes the double hash algorithm to generate a start number and a step number based on the GUID 25 and the MNSD 79. At operation 130, the processing module 52 locates the primary storage device 46 by utilizing the start number to index into the appropriate storage device entry 72 in the cluster map 42. At operation 132, the processing module 52 determines if the primary storage device is available by utilizing the status 74 in the appropriate storage device entry 72 in the cluster map 42. If the status 74 indicates the primary storage device is available then a branch is made to operation 136. Otherwise, a branch is made to operation 134.

At operation 134, the processing module 52 initializes a storage counter to zero. The storage counter is utilized to count the number of storage devices that are written into by the processing module 52.

At operation 136, the processing module 52 requests the profile manager 44 on the back end server 30 at San Francisco to store the user profile 54. The request includes a copy of the user profile 54 (e.g., updated by the application 38), the GUID 25. Next the processing module 52 initializes the storage counter to one thereby registering a first write of the user profile 54.

At operation 147, the profile manager 44 on the backend server 30 at San Francisco 13 stores the user profile in the storage device 46 (e.g., cache).

At operation 140, the processing module 52, at the application server 28 at San Francisco 13, adds the step number to the start number to compute a back up number. Next, the processing module 52 locates the secondary storage device 46 based on the back up number (operation 142) and, at decision operation 144, determines if the located secondary storage device is available. The processing module 52 utilizes the appropriate storage device entry 72 in the cluster map 42 and reads the status 74 to make this determination. If the secondary storage device 56 is available, a branch is made to operation 146. Otherwise, a branch is made to operation 148.

At operation 146, the processing module 52 communicates a request to store the data item on the storage device. The request includes a copy of the user profile 54 that has been updated by the application 38 and the GUID 25. Next, the processing module 52 increments the storage counter by one thereby registering a write of the user profile 54.

At decision operation 152, the processing module 52 determines if the storage counter equals two. If the storage counter equals two then the method 124 ends. Otherwise, a branch is made to operation 148.

At operation 148, the processing module 52 adds the step number to the back up number to compute a new back up number. Next, the processing module 52 determines if the back up number is greater than the maximum number of devices (operation 154). If the back up number is greater than the maximum number of devices, a branch is made to operation 156. Otherwise, a branch is made to decision operation 158. At operation 156, the processing module 52 modulos the back up number with the MNSD 79.

At decision operation 158, the processing module 52 determines if the back up number is equal to the start number. If the backup number is not equal to the start number then a branch is made to operation 142. If the backup number is equal to the start number then the storage devices 46 have been exhausted, the method 124 ends, and processing continues at operation 160 on FIG. 4.

Returning to FIG. 4 at operation 160, the application 38 personalizes the web page based on the user profile 54 and communicates the web page to the client machine 20. At operation 162, the user receives the personalized web page as illustrated on FIG. 8.

Figure 8:
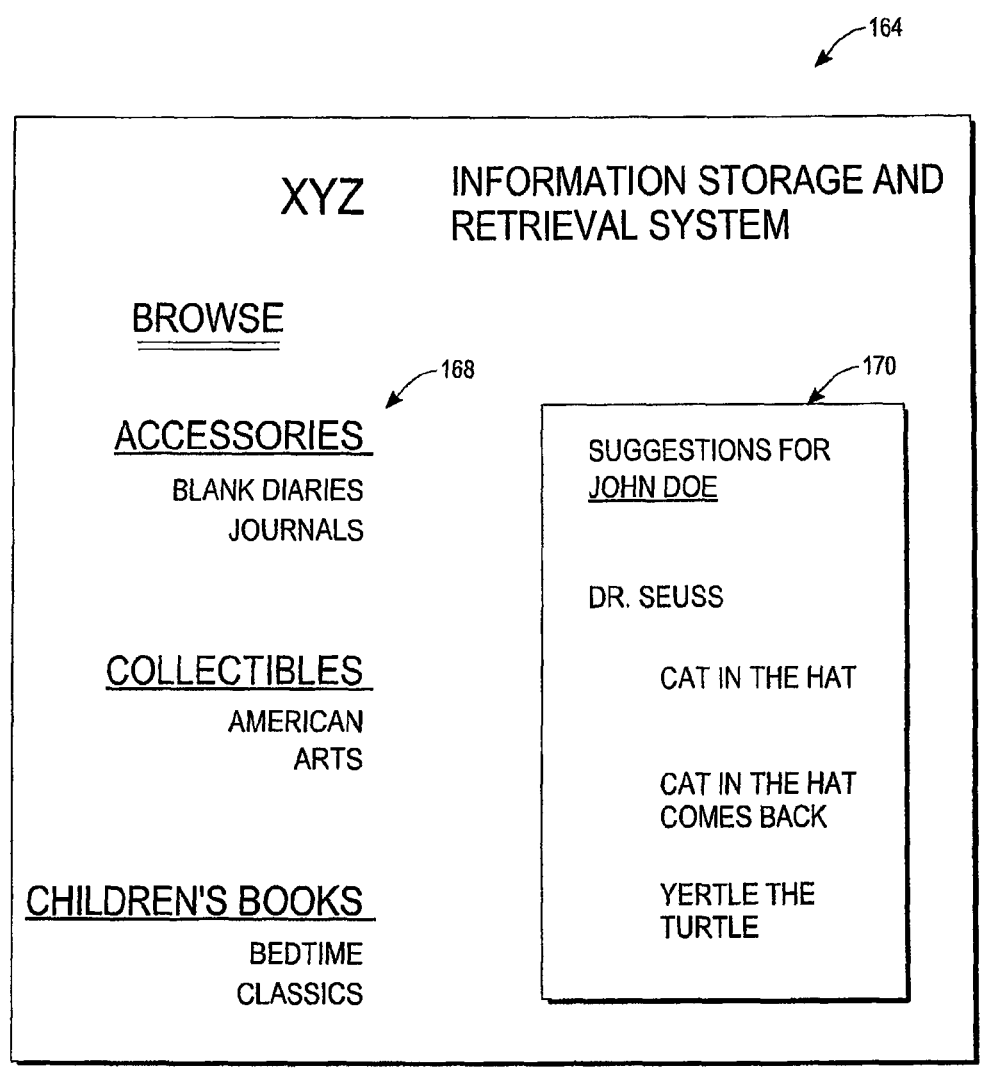

FIG. 8 illustrates a user interface 164, according to an exemplary embodiment, to browse books. The user interface 164 includes book-browsing categories 168 and is personalized in the form of suggestions 170 for John Doe, the user operating the client machine 20. The application 38 generated the suggestions 170 by utilizing the user profile 54.

Returning to FIG. 4, at operation 172, a period of time has elapsed (e.g., 5 minutes) after the users last selection at the client machine 20 thereby triggering the profile manager 44 to communicate the user profile 54 to the database servers 34 that, in turn, stores the user profile to the database 36. At operation 174, a similar timeout occurs with respect to the profile manager 44 at the back end server 30 at the New York 15 and a similar operation is performed.

Network Based Trading Platform Embodiment

The above-described invention may be embodied in any system that requires the storage and retrieval of data items. For example, the invention may be embodied in a network-based trading platform 230 as described below.

Figure 9:
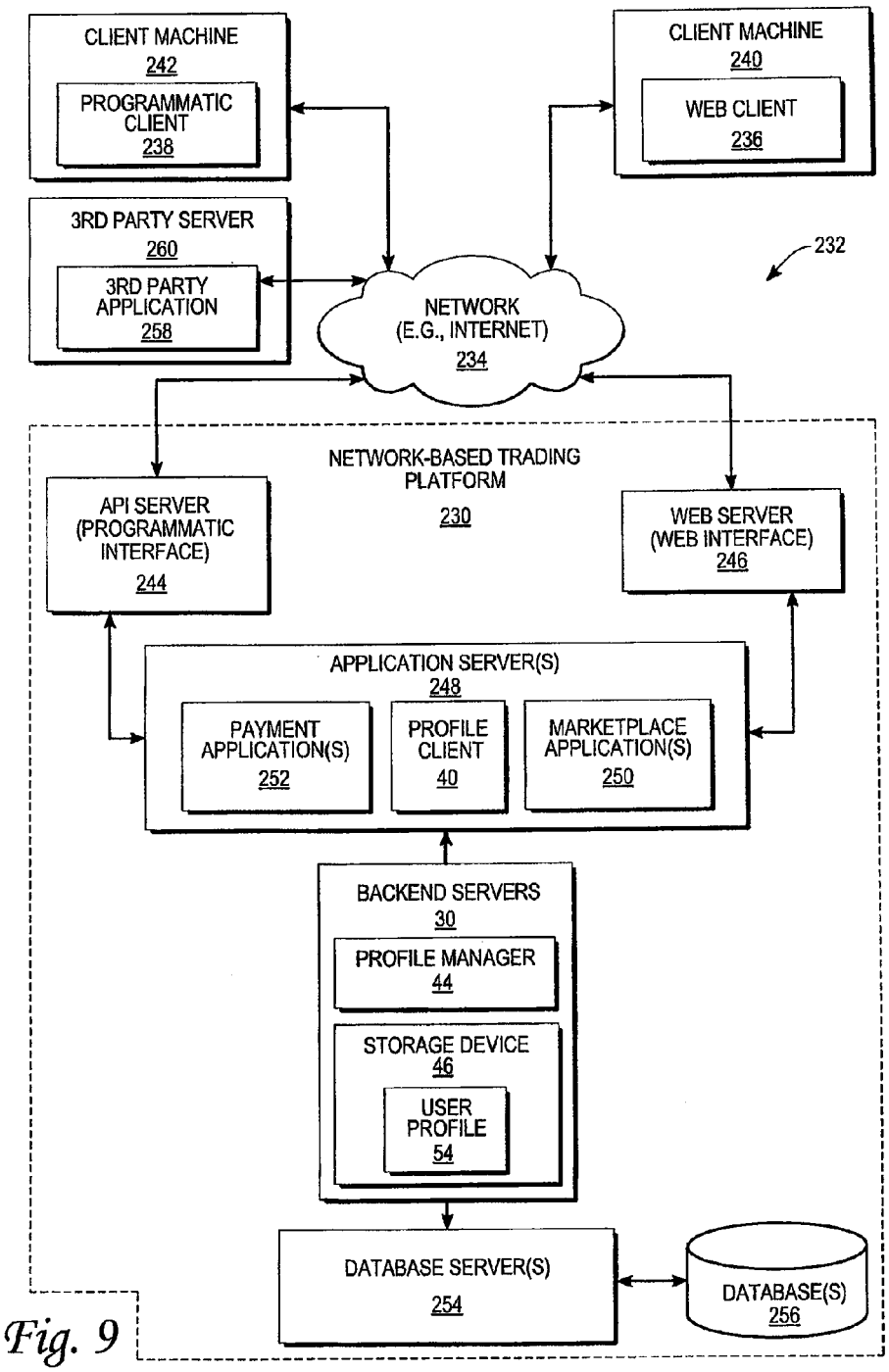
FIG. 9 is a block diagram illustrating a trading system, according to an exemplary embodiment of the present invention.

FIG. 9 is a network diagram depicting a system 232, according to one exemplary embodiment of the present invention, having a client-server architecture. A commerce platform, in the exemplary form of a network-based trading platform 230, provides server-side functionality, via a network 234 (e.g., the Internet) to one or more clients. FIG. 9 illustrates, for example, a web client 236 (e.g., a browser, such as the INTERNET EXPLORER browser developed by Microsoft Corporation of Redmond, Wash. State), and a programmatic client 238 executing on respective client machines 240 and 242.

Turning specifically to the network-based trading platform 230, an Application Program Interface (API) server 244 and a web server 246 are coupled to, and provide programmatic and web interfaces respectively to, one or more application servers 248. The application servers 248 host one or more marketplace applications 250 and payment applications 252 and a profile client 40. The application servers 248 are, in turn, shown to be coupled to one or more back end servers 30 that include a profile manager 44 and a storage device 46 that operate to provide personalization services as previously described. The storage device 46 also includes a user profile 54 that may be persistently stored to the database 256, as previously described. The back end servers 30 are, in turn, shown to be coupled to one or more databases servers 254 that facilitate access to one or more databases 256.

The marketplace applications 250 provide a number of marketplace functions and services to users that access the network-based trading platform 230. The payment applications 252 likewise provide a number of payment services and functions to users. The payment applications 252 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 250. While the marketplace applications 250 and payment applications 252 are shown in FIG. 9 to both form part of the network-based trading platform 230, it will be appreciated that, in other embodiments, the payment applications 252 may form part of a payment service that is separate and distinct from the network-based trading platform 230.

Further, while the system 232 shown in FIG. 9 employs a client-server architecture, the present invention is of course not limited to such an architecture, and could equally well find application in a distributed, or peer-to-peer, architecture system. The various marketplace and payment applications 250 and 252 could also be implemented as standalone software programs, which do not necessarily have networking capabilities.

The web client 236, it will be appreciated, accesses the various marketplace and payment applications 250 and 252 via the web interface supported by the web server 246. Similarly, the programmatic client 238 accesses the various services and functions provided by the marketplace and payment applications 250 and 252 via the programmatic interface provided by the API server 244. The programmatic client 238 may, for example, be a seller application (e.g., the TURBOLISTER application developed by eBay Inc., of San Jose, Calif.) to enable sellers to author and manage listings on the network-based trading platform 230 in an off-line manner, and to perform batch-mode communications between the programmatic client 238 and the network-based trading platform 230.

FIG. 9 also illustrates a third party application 258, executing on a third party server machine 260, as having programmatic access to the network-based trading platform 230 via the programmatic interface provided by the API server 244. For example, the third party application 258 may, utilizing information retrieved from the network-based trading platform 230, support one or more features or functions on a website hosted by the third party. The third party website may, for example, provide one or more promotional, marketplace or payment functions that are supported by the relevant applications of the network-based trading platform 230.

Marketplace and Payment Applications

Figure 10:
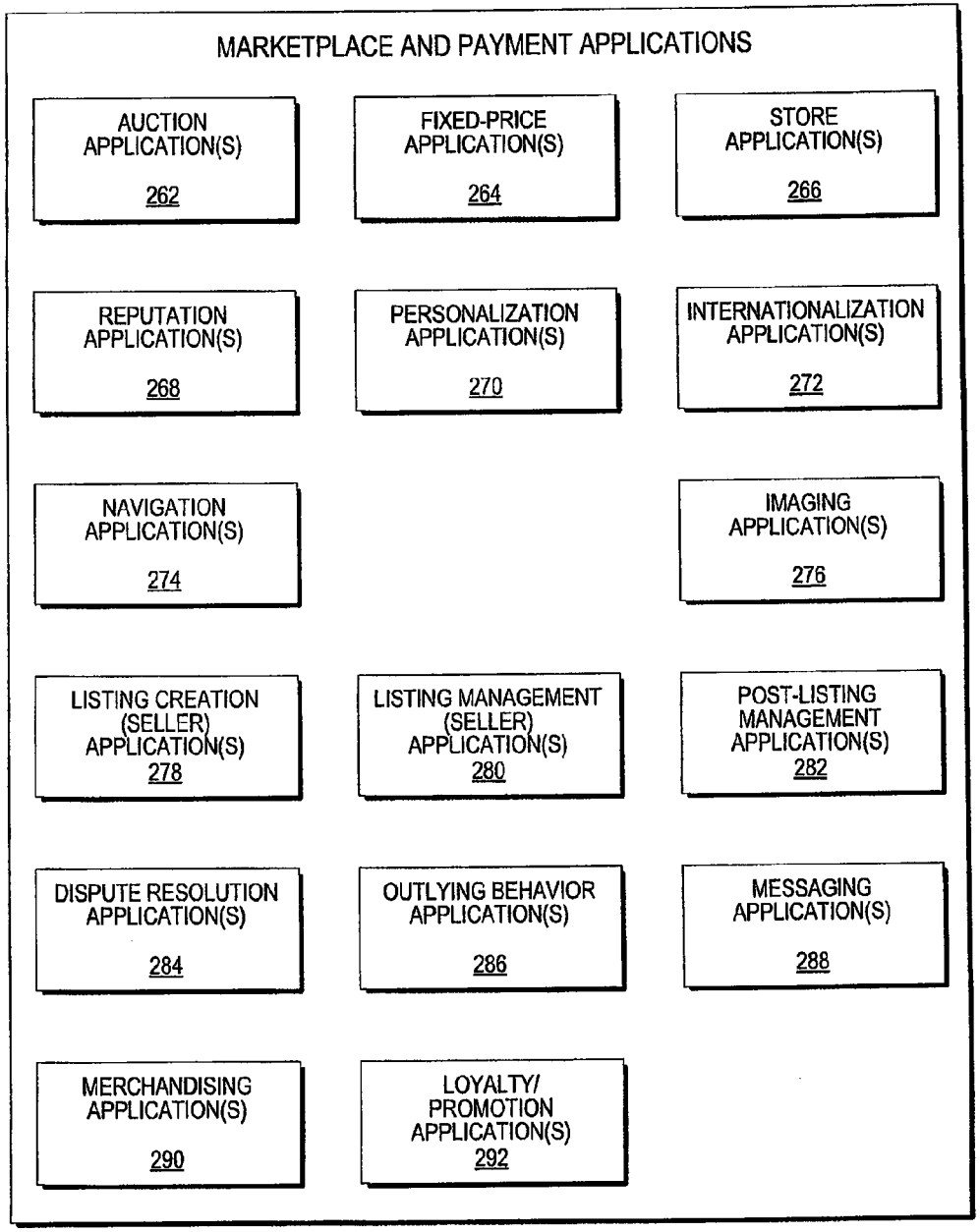
FIG. 10 is a block diagram illustrating multiple marketplace and payment applications that, in one exemplary embodiment of the present invention, are provided as part of the network-based trading platform.

FIG. 10 is a block diagram illustrating multiple marketplace applications 250 and payment applications 252 that, in one exemplary embodiment, are provided as part of the network-based trading platform 230. The marketplace applications 250 and payment applications may utilize a profile client 40 (not illustrated) to obtain personalization services. For example, the personalization services may include storage and retrieval of a user profile 54 (not illustrated) that is utilized by the marketplace applications 250 or payment applications 252 to personalize a web page as previously described with respect to system 10.

Turning to the illustrated marketplace applications 250 and payment applications 252, the network-based trading platform 230 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 250 are shown to include one or more auction applications 262 which support auction-format listing and price setting mechanisms (e.g., English, Dutch, Vickrey, Chinese, Double, Reverse auctions etc.). The various auction applications 262 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 264 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 266 allow sellers to group their listings within a "virtual" store, which may be branded and otherwise personalized by and for the sellers. Such a virtual store may also offer promotions, incentives and features that are specific and personalized to a relevant seller.

Reputation applications 268 allow parties that transact utilizing the network-based trading platform 230 to establish, build and maintain reputations, which may be made available and published to potential trading partners. Consider that where, for example, the network-based trading platform 230 supports person-to-person trading, users may have no history or other reference information whereby the trustworthiness and credibility of potential trading partners may be assessed. The reputation applications 268 allow a user, for example through feedback provided by other transaction partners, to establish a reputation within the network-based trading platform 230 over time. Other potential trading partners may then reference such a reputation for the purposes of assessing credibility and trustworthiness.

Personalization applications 270 allow users of the network-based trading platform 230 to personalize various aspects of their interactions with the network-based trading platform 230. For example a user may, utilizing an appropriate personalization application 270, create a personalized reference page at which information regarding transactions to which the user is (or has been) a party may be viewed. Further, a personalization application 270 may enable a user to personalize listings and other aspects of their interactions with the network-based trading platform 230 and other parties.

In one embodiment, the network-based trading platform 230 may support a number of marketplaces that are customized, for example, for specific geographic regions. A version of the network-based trading platform 230 may be customized for the United Kingdom, whereas another version of the network-based trading platform 230 may be customized for the United States. Each of these versions may operate as an independent marketplace, or may be customized (or internationalized) presentations of a common underlying marketplace. The latter version may characterize a user's access to the network-based trading platform 230 as originating from a particular country by identifying the country specific presentation that is selected by the user.

Navigation of the network-based trading platform 230 may be facilitated by one or more navigation applications 274. For example, a search application allows a user to execute key word searches of listings published via the network-based trading platform 230. A browse application allows users to browse various category, catalogue, or inventory data structures according to which the listings may be classified within the network-based trading platform 230.

In order to make listings, available via the network-based trading platform 230, as visually informing and attractive as possible, the marketplace applications 250 may include one or more imaging applications 276 utilizing which users may upload images for inclusion within listings. An imaging application 276 also operates to incorporate images within viewed listings. The imaging applications 276 may also support one or more promotional features, such as image galleries that are presented to potential buyers. For example, sellers may pay an additional fee to have an image included within a gallery of images for promoted items.

Listing creation applications 278 allow sellers to conveniently author listings pertaining to goods or services that they wish to transact via the network-based trading platform 230, and listing management applications 280 allow sellers to manage such listings. Specifically, where a particular seller has authored and/or published a large number of listings, the management of such listings may present a challenge. The listing management applications 280 provide a number of features (e.g., auto-relisting, inventory level monitors, etc.) to assist the seller in managing such listings. One or more post-listing management applications 282 also assist sellers with a number of activities that typically occur post-listing. For example, upon completion of an auction facilitated by one or more auction applications 262, a buyer may wish to leave feedback regarding a particular seller. To this end, a post-listing management application 282 may provide an interface to one or more reputation applications 268, so as to allow the buyer to conveniently to provide feedback regarding a seller to the reputation applications 268. Feedback may take the form of a review that is registered as a positive comment, a neutral comment or a negative comment. Further, points may be associated with each form of comment (e.g., +1 point for each positive comment, 0 for each neutral comment, and −1 for each negative comment) and summed to generate a rating for the seller.

Dispute resolution applications 284 provide mechanisms whereby disputes arising between transacting parties may be resolved. For example, the dispute resolution applications 284 may provide guided procedures whereby the parties are guided through a number of steps in an attempt to settle a dispute. In the event that the dispute cannot be settled via the guided procedures, the dispute may be escalated to a third party mediator or arbitrator.

Messaging applications 288 are responsible for the generation and delivery of messages to users of the network-based trading platform 230, such messages for example advising users regarding the status of listings at the network-based trading platform 230 (e.g., providing "outbid" notices to bidders during an auction process or to provide promotional and merchandising information to users).

Merchandising applications 290 support various merchandising functions that are made available to sellers to enable sellers to increase sales via the network-based trading platform 230. The merchandising applications 290 also operate the various merchandising features that may be invoked by sellers, and may monitor and track the success of merchandising strategies employed by sellers.

The network-based trading platform 230 itself, or one or more parties that transact via the network-based trading platform 230, may operate loyalty programs that are supported by one or more loyalty/promotions applications 292. For example, a buyer may earn loyalty or promotions points for each transaction established and/or concluded with a particular seller, and be offered a reward for which accumulated loyalty points can be redeemed.

Marketplace Data Structures

Figure 11:
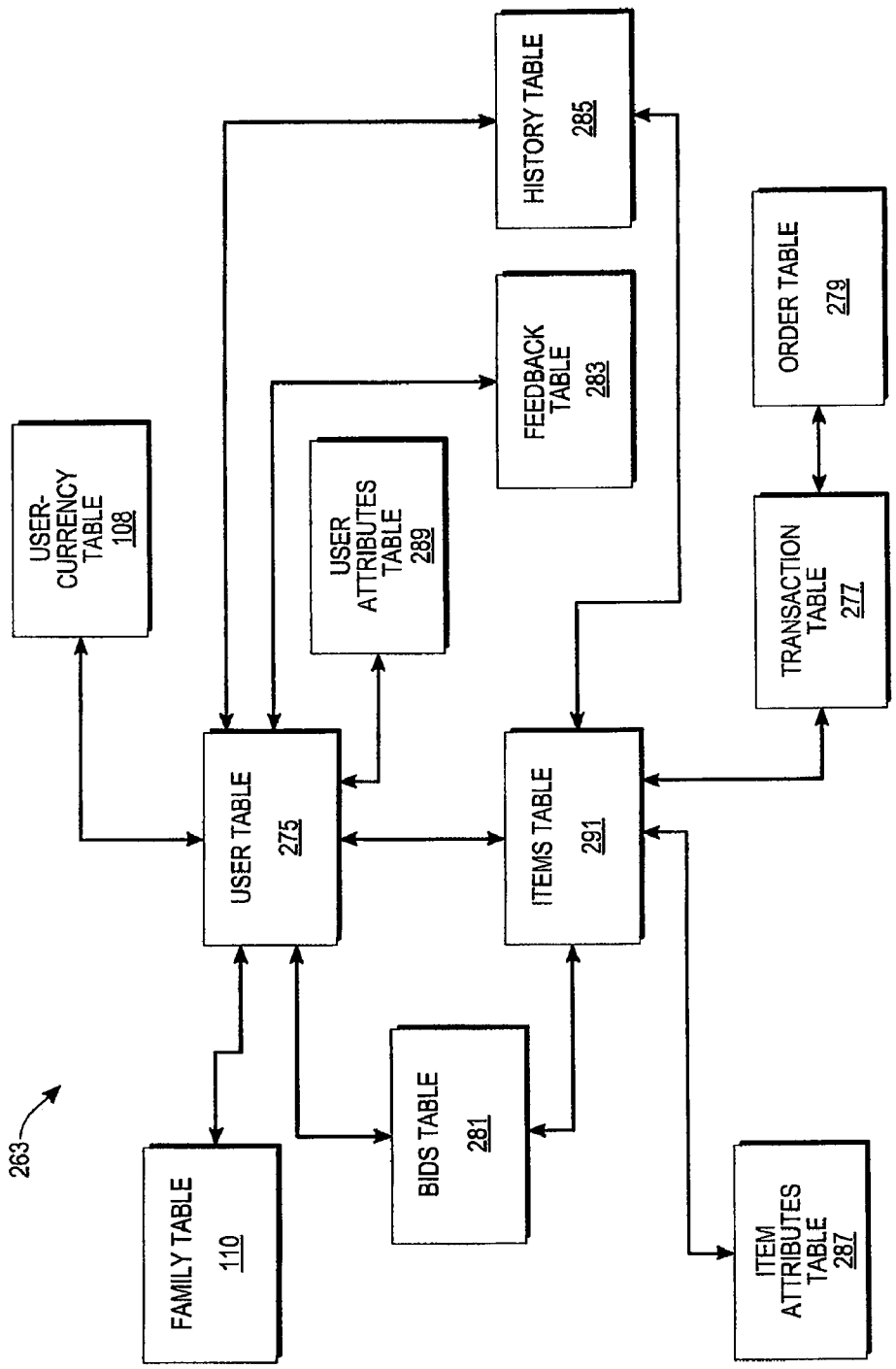
FIG. 11 is a high-level entity-relationship diagram, illustrating various tables that are utilized by and support the network-based trading platform and payment applications, according to an exemplary embodiment of the present invention.

FIG. 11 is a high-level entity-relationship diagram, illustrating various tables 263 that may be maintained within the databases 256, and that are utilized by and support the marketplace applications 250 and payment applications 252. While the exemplary embodiment of the present invention is described as being at least partially implemented utilizing a relational database, other embodiments may utilize other database architectures (e.g., an object-oriented database schema).

A user table 275 contains a record for each registered user of the network-based trading platform 230, and may include identifier, address and financial instrument information pertaining to each such registered user. A user may operate as a seller, a buyer, or both, within the network-based trading platform 230. In one exemplary embodiment of the present invention, a buyer may be a user that has accumulated value (e.g., commercial or proprietary currency), and is then able to exchange the accumulated value for items that are offered for sale by the network-based trading platform 230.

The tables 263 also include an items or listings table 291 in which are maintained item records for goods and services that are available to be, or have been, transacted via the network-based trading platform 230. Each item record within the items table 291 may furthermore be linked to one or more user records within the user table 275, so as to associate a seller and one or more actual or potential buyers with each item record.

A transaction table 277 contains a record for each transaction (e.g., a purchase transaction) pertaining to items for which records exist within the items table 291.

An order table 279 is populated with order records, each order record being associated with an order. Each order, in turn, may be with respect to one or more transactions for which records exist within the transactions table 277.

Bid records within a bids table 281 each relate to a bid received at the network-based trading platform 230 in connection with an auction-format listing supported by an auction application 262. A feedback table 283 is utilized by one or more reputation applications 268, in one exemplary embodiment, to construct and maintain reputation information concerning users. A history table 285 maintains a history of transactions to which a user has been a party. One or more attributes tables including an item attributes table 287 that records attribute information pertaining to items for which records exist within the items table 291 and a user attributes table 289 that records attribute information pertaining to users for which records exist within the user table 275.

Figure 12:
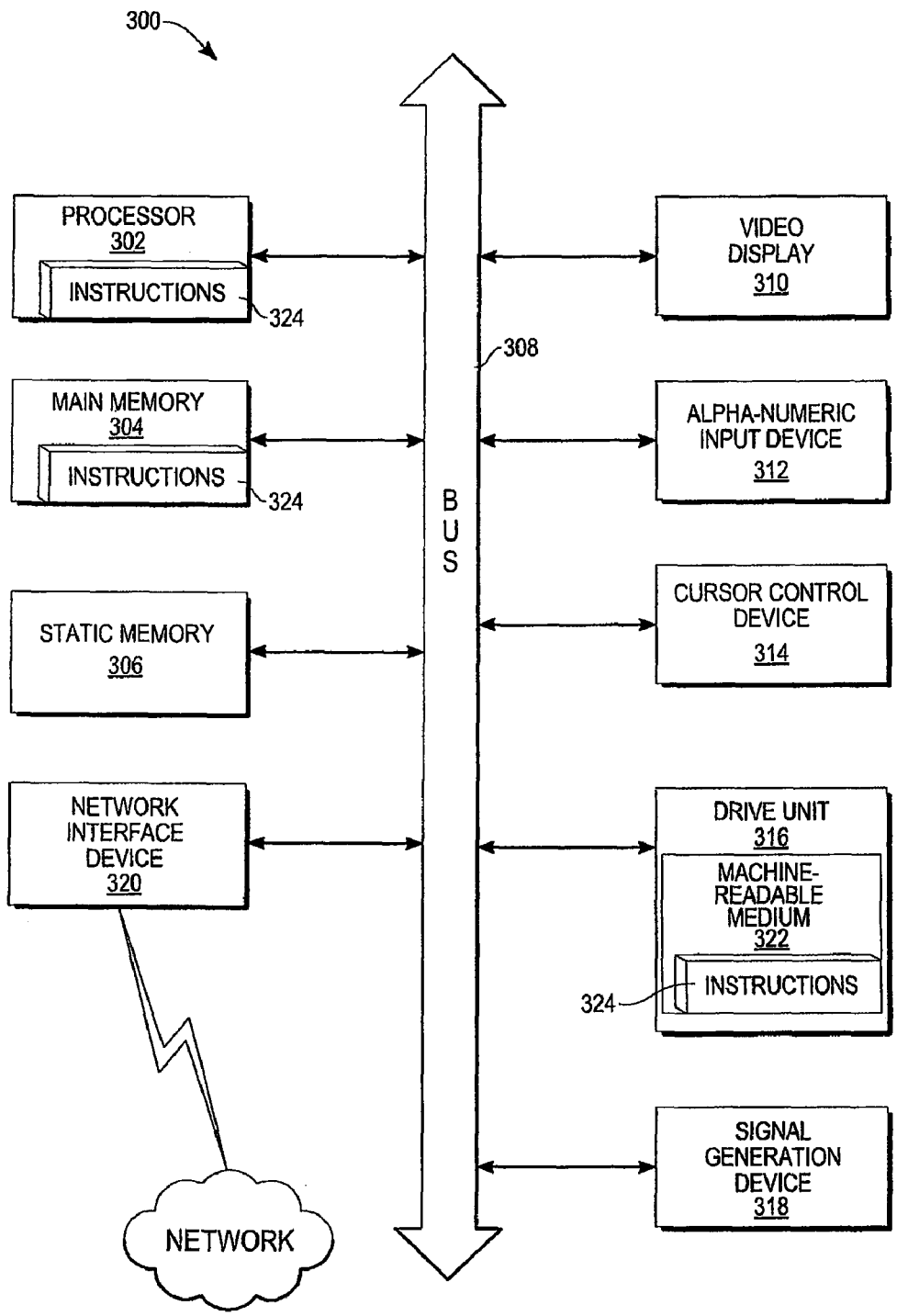
FIG. 12 illustrates a diagrammatic representation of a machine, in the exemplary form of a computer system, within which a set of instructions, for causing the machine to perform any one or more of the methodologies discussed herein, may be executed.

FIG. 12 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media and magnetic media. Nevertheless, the term "machine-readable medium" shall not be taken to include "carrier wave signals."

Thus, a method and system to locate a storage device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of locating a storage device of a number of storage devices, the method comprising:
   receiving a request for a data item, the request including a globally unique identifier (GUID) that is associated with a user;
   generating a start number based on the GUID;
   locating the storage device that stores the data item from the number of storage devices based on the start number; and
   reading the data item from the located storage device.

2. The method of claim 1, further comprising:
   receiving a maximum number of storage devices, the start number being generated based on the GUID and the maximum number of storage devices.

3. The method of claim 1, further comprising:
   generating a step number based on the GUID;
   identifying that the storage device is unavailable;
   based on the identification, locating a secondary storage device, of the number of storage devices, that stores the data item based on the start number and the step number; and
   reading the data item from the secondary storage device.

4. The method of claim 3, further comprising:
   adding the start number to the step number to define a location number, the location of the secondary storage device being based on the location number.

5. The method of claim 3, further comprising:
   receiving a maximum number of storage devices, the start number and the step number being generated based an application of a double hash algorithm to the GUID and the maximum number of storage devices.

6. The method of claim 1, wherein the GUID identifies the user.

7. The method of claim 1, wherein the GUID identifies a profile associated with the user.

8. A method of locating a storage device of a number of storage devices, the method comprising:
   receiving a request to store a data item, the request including a globally unique identifier (GUID) that is associated with a user;
   generating a start number based on the GUID;
   locating the storage device, of the number of storage devices, based on the start number; and
   storing the data item in the located storage device.

9. The method of claim 8, further comprising:
receiving a maximum number of storage devices, the start number being generated based on the GUID and the maximum number of storage devices.

10. The method of claim 8, further comprising:
generating a step number based on the GUID;
identifying that the storage device is unavailable;
based on the identification, locating a secondary storage device, of the number of storage devices, based on the start number and the step number; and
storing the data item in the secondary storage device.

11. The method of claim 10, further comprising:
adding the start number to the step number to define a location number, the location of the secondary storage device being based on the location number.

12. The method of claim 10, further comprising:
receiving a maximum number of storage devices, the start number and the step number being generated based on an application of a double hash algorithm to the GUID and the maximum number of storage devices.

13. The method of claim 8, wherein the GUID identifies the user.

14. The method of claim 8, wherein the GUID identifies a profile associated with the user.

15. A system to locate a storage device of a number of storage devices, the system comprising:
a processor; and
a memory in communication with the processor, the memory being configured to store a receiving module and a processing module that are executable by the processor,
the receiving module having instructions that when executed by the processor, cause operations to be performed, the operations comprising:
receiving a request for a data item, the request including a globally unique identifier (GUID) that is associated with a user; and
receiving a maximum number of storage devices, and
the processing module having instructions that when executed by the processor, cause operations to be performed, the operations comprising:
generating a start number based on the GUID and the maximum number of storage devices;
locating the storage device that stores the data item, of the number of storage devices, based on the start number; and
reading the data item from the located storage device.

16. The system of claim 15, wherein the operations at the processing module further comprising:
generating a step number based on the GUID and the maximum number of storage devices;
identifying that the storage device is unavailable;
based on the identification, locating a secondary storage device that stores the data item, of the number of storage devices, based on the start number and the step number; and
reading the data item from the secondary storage device.

17. The system of claim 16, wherein the start number and the step number are generated based on an application of a double hash algorithm to the GUID and the maximum number of storage devices.

18. A system to locate a storage device of a number of storage devices, the system comprising:
a processor; and
a memory in communication with the processor, the memory being configured to store a receiving module and a processing module that are executable by the processor,
the receiving module having instructions that when executed by the processor, cause operations to be performed, the operations comprising:
receiving a request to store a data item, the request including a globally unique identifier (GUID) that is associated with a user; and
receiving a maximum number of storage devices, and
the processing module having instructions that when executed by the processor, cause operations to be performed, the operations comprising:
generating a start number based on the GUID and the maximum number of storage devices;
locating the storage device, of the number of storage devices, based on the start number; and
storing the data item in the located storage device.

19. The system of claim 18, further comprising:
generating a step number based on the GUID and the maximum number of storage devices;
identifying that the storage device is unavailable;
based on the identification, locating a secondary storage device, of the number of storage devices, based on the start number and the step number; and
storing the data item in the secondary storage device.

20. A non-transitory machine-readable medium that stores instructions, which, when performed by a machine, cause the machine to perform operations comprising:
receiving a request for a data item, the request including a globally unique identifier (GUID) that is associated with a user;
generating a start number based on the GUID;
locating the storage device that stores the data item, of the number of storage devices, based on the start number; and
reading the data item from the located storage device.

* * * * *